US012603326B2

(12) United States Patent
Chakir et al.

(10) Patent No.: US 12,603,326 B2
(45) Date of Patent: Apr. 14, 2026

(54) SOLID LITHIUM CELL, BATTERY COMPRISING SAID CELLS AND MANUFACTURING PROCESS FOR MANUFACTURING SAID BATTERY

(71) Applicant: RENAULT S.A.S., Boulogne-Billancourt (FR)

(72) Inventors: Mohamed Chakir, saint Germain les Arpajon (FR); Akhil Dileep, Kerala (IN); Balaji Kalyanarangan, Chennai (IN); Madhumithaa Murali-A, Chennai (IN); Jayanth-Ramaswami Ramamurthy, Chennai (IN); Konda-Shiva Reddy, Chennai (IN)

(73) Assignee: AMPERE S.A.S., Boulogne-Billancourt (FR)

( * ) Notice: Subject to any disclaimer, the term of this patent is extended or adjusted under 35 U.S.C. 154(b) by 602 days.

(21) Appl. No.: 18/004,398

(22) PCT Filed: Jul. 6, 2021

(86) PCT No.: PCT/EP2021/068652
§ 371 (c)(1),
(2) Date: Jan. 5, 2023

(87) PCT Pub. No.: WO2022/008506
PCT Pub. Date: Jan. 13, 2022

(65) Prior Publication Data
US 2023/0282887 A1    Sep. 7, 2023

(30) Foreign Application Priority Data

Jul. 10, 2020    (IN) .............................. 202041029482
Aug. 24, 2020    (FR) ....................................... 2008647

(51) Int. Cl.
*H01M 4/133*    (2010.01)
*H01M 4/131*    (2010.01)
(Continued)

(52) U.S. Cl.
CPC ......... *H01M 10/058* (2013.01); *H01M 4/131* (2013.01); *H01M 4/505* (2013.01);
(Continued)

(58) Field of Classification Search
None
See application file for complete search history.

(56) References Cited

U.S. PATENT DOCUMENTS

2013/0045427 A1* 2/2013 Zhamu .............. H01M 10/0525
977/734
2016/0351973 A1* 12/2016 Albano ................. H01M 4/628
(Continued)

FOREIGN PATENT DOCUMENTS

CN      109841796      *  6/2019   ........ H01M 10/0525

OTHER PUBLICATIONS

English translation of CN 109841796 (Year: 2019).*

*Primary Examiner* — Yoshitoshi Takeuchi
(74) *Attorney, Agent, or Firm* — Oblon, McClelland, Maier & Neustadt, L.L.P.

(57)    ABSTRACT

A solid lithium cell is formed by stacking an etched copper substrate, a layer of graphite, an electrolyte, and a layer of nickel, manganese, and cobalt oxides. The electrolyte is in contact with the graphite layer and the layer of nickel, manganese, and cobalt oxides. The copper substrate forms the anode of the cell. The layer of nickel, manganese and cobalt oxides forms the cathode of the cell. The electrolyte is a solid lithium-based electrolyte. The graphite layer has a first solid electrolyte interface produced during a pre-lithiation with a liquid lithium-based electrolyte and a second (Continued)

Figure 1:
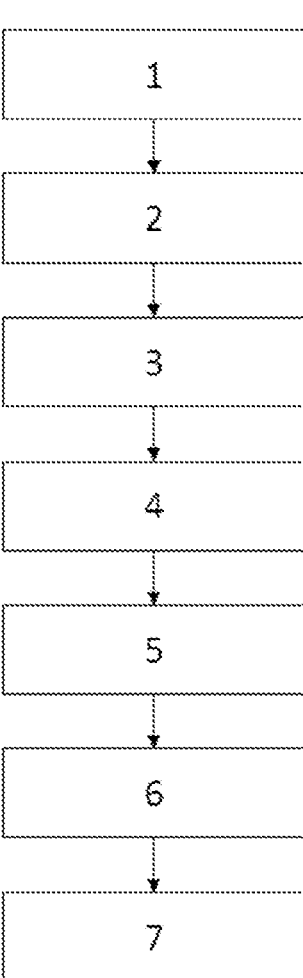

solid electrolyte interface produced during a pre-lithiation with the solid lithium-based electrolyte.

10 Claims, 2 Drawing Sheets

(51) Int. Cl.

| | |
|---|---|
| *H01M 4/50* | (2010.01) |
| *H01M 4/505* | (2010.01) |
| *H01M 4/52* | (2010.01) |
| *H01M 4/525* | (2010.01) |
| *H01M 4/583* | (2010.01) |
| *H01M 4/587* | (2010.01) |
| *H01M 4/66* | (2006.01) |
| *H01M 10/0565* | (2010.01) |
| *H01M 10/058* | (2010.01) |
| *H01M 50/512* | (2021.01) |

(52) U.S. Cl.
CPC ........... *H01M 4/525* (2013.01); *H01M 4/587* (2013.01); *H01M 4/661* (2013.01); *H01M 10/0565* (2013.01); *H01M 50/512* (2021.01); *H01M 2300/0082* (2013.01)

(56) References Cited

U.S. PATENT DOCUMENTS

| | | | |
|---|---|---|---|
| 2019/0140267 A1* | 5/2019 | Gopalakrishnan Nair .................. H01M 4/0423 | |
| 2019/0363350 A1* | 11/2019 | Weber .................... H01M 4/366 | |
| 2020/0083518 A1* | 3/2020 | Yakovleva ............ H01M 4/134 | |
| 2021/0126286 A1* | 4/2021 | Rogojina .............. H01M 4/583 | |
| 2022/0223830 A1* | 7/2022 | Ryu ..................... H01M 4/587 | |
| 2022/0359857 A1* | 11/2022 | Jang .................. H01M 10/0525 | |
| 2023/0096724 A1* | 3/2023 | Jang .................... H01M 10/056 429/324 | |
| 2023/0317916 A1* | 10/2023 | Yang ................. H01M 50/4295 429/326 | |

* cited by examiner

SOLID LITHIUM CELL, BATTERY COMPRISING SAID CELLS AND MANUFACTURING PROCESS FOR MANUFACTURING SAID BATTERY

The present invention relates to lithium batteries and in particular to solid lithium batteries.

It is expected that solid electrolyte battery technology will make it possible to improve the capacity of existing batteries and also their operational safety compared to liquid electrolyte batteries, in particular for lithium ion batteries.

Conventional solid lithium batteries comprise a cathode, a solid polymer electrolyte and an anode, as in the case of liquid electrolyte lithium ion batteries. More specifically, solid lithium batteries are manufactured by stacking the anode, the electrolyte and the cathode between a copper substrate and an aluminum substrate, the anode being in contact with the copper substrate and the cathode with the aluminum substrate.

The anode can be constituted of graphite, while the solid polymer electrolyte is a compound comprising PVDF-HFP (poly(vinylidene fluoride)-co-poly(hexafluoropropylene)), LITFSI (lithium bis(trifluoromethylsulfonyl)imide) and TEG-DME (tetraethylene glycol dimethyl ether).

Despite the improvements that can be expected from solid lithium batteries, it is still necessary to improve the graphite-electrolyte interface before obtaining usable batteries. In their present state, the batteries comprise a graphite-electrolyte interface which consumes more lithium ions than are available, which impedes the transfer of lithium ions. This results in the formation of an SEI (solid-electrolyte interface) and the impossibility of carrying out a charging or a discharging.

In addition, a second problem exists at the interface between the copper substrate and the graphite anode due to exfoliation. During the prelithiation of the graphite electrode, the interface between the graphite electrode and the copper substrate undergoes a coinsertion of solvent with lithium ions. This results in the flaking and the fragmentation of the prelithiated electrode, leading to a damaged and unsuitable electrode.

In other words, the lithium ions become inserted between the graphite anode and the copper substrate, reducing the adhesion of the graphite anode to the copper substrate, which leads to flaking.

In addition to structurally damaging the graphite anode, this insertion (or intercalation) effect produces a greater contact resistance of the graphite anode, further reducing the charge and discharge capacity.

There consequently exists a problem with solid lithium batteries which have a low or nonexistent capacity compared to the theoretically predicted capacity.

A stage of prelithiation of the graphite anodes has been proposed for the manufacture of solid electrolyte batteries, in order to reduce the amount of lithium consumed during the first cycles for the formation of the SEI. The prelithiation of graphite anodes outside the final cell, by means of an electrochemical process, is known from patents and the scientific literature.

In particular, the document U.S. Pat. No. 5,759,715 A is known from the state of the art and describes a process for carrying out this prelithiation stage in a first cell, withdrawing the prelithiated anode and then assembling the final cell with the prelithiated anode.

The document U.S. Pat. No. 5,759,715 A discloses a process for the construction of an electrochemical cell having at least one electrode which is prelithiated in a "precursor" cell before the assembling of the final cell or of the battery. Preferably, the particles of active material, $V_6O_{13}$ or graphite, or both, are prepared in a "precursor" cell by prelithiation before the assembling of the final cell. Such a prelithiation is obtained by chemically or electrochemically inserting lithium ions into the graphite electrode.

However, none of these documents addresses the technical problems identified above.

A subject matter of the invention is a solid lithium cell which is formed by the stacking of an etched copper substrate, of a graphite layer, of an electrolyte and of a layer of nickel, manganese and cobalt oxides, the electrolyte being in contact with the graphite layer and the layer of nickel, manganese and cobalt oxides, the copper substrate forming the anode of the cell and the layer of nickel, manganese and cobalt oxides forming the cathode of the cell. The electrolyte is a solid lithium-based electrolyte, and the graphite layer exhibits a first solid electrolyte interface produced during a prelithiation with a liquid lithium-based electrolyte and a second solid electrolyte interface produced during a prelithiation with the solid lithium-based electrolyte.

The solid lithium electrolyte can be a porous membrane electrolyte made of poly(vinylidene fluoride)-poly(hexafluoropropylene) improved with lithium bis(trifluoromethylsulfonyl)imide.

The copper substrate and the graphite layer can be rendered integral mechanically.

The layer of nickel, manganese and cobalt oxides can have the formula $LiNi_xMn_yCo_zO_2$, where x, y, and z represent atomic percentage values and x is of between 0.3 and 0.8, y is of between 0.1 and 0.3, and z is of between 0.1 and 0.3.

A solid lithium battery can comprise at least two cells such as that described above, fitted in parallel.

Another subject matter of the invention is a manufacturing process for manufacturing a solid lithium battery as described above, comprising the following stages:

carrying out a wet etching of a copper substrate in order to obtain a relief pattern, placing a graphite layer on the etched copper substrate, assembling a first cell comprising the graphite layer on the etched copper substrate, a layer of nickel, manganese and cobalt oxides and a liquid lithium-based electrolyte in contact both with the graphite layer and with the layer of nickel, manganese and cobalt oxides, carrying out a prelithiation of the graphite layer of the first cell, withdrawing, from the first cell, the prelithiated graphite layer fixed to the etched copper substrate, assembling a second cell comprising the prelithiated graphite layer on the etched copper substrate, a layer of nickel, manganese and cobalt oxides and a solid lithium-based electrolyte in contact with the prelithiated graphite layer and with the layer of nickel, manganese and cobalt oxides, assembling a solid lithium battery comprising at least two second cells in parallel.

The first cell prelithiation can be carried out with a discharge cycle, in a constant current and constant voltage mode at 0.05 C at ambient temperature and a voltage window of OCV-10 mV.

The etching of the copper substrate can comprise the following stages:

applying a solution of $FeCl_3$, HCl and $H_2O$ for 30 seconds, washing the copper substrate with an ammonium bicarbonate $NH_4HCO_3$ solution and then with water, and drying the copper substrate over a hot plate at 80° C.

The solid lithium-based electrolyte can be a dry polymer electrolyte.

The solid lithium-based electrolyte can be a porous membrane electrolyte made of poly(vinylidene fluoride)-poly(hexafluoropropylene) improved with lithium bis(trifluoromethylsulfonyl)imide.

Figure 2:
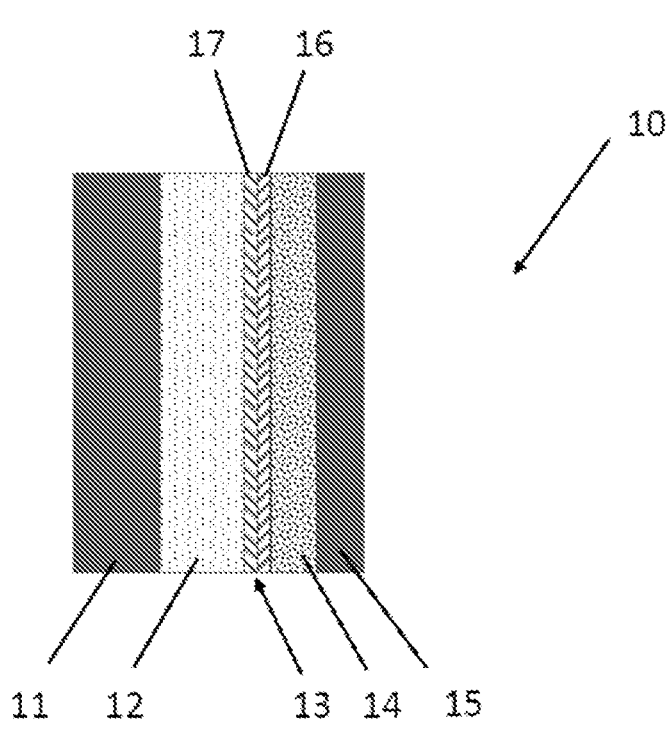

A better understanding of the present invention will be obtained on studying the detailed description of a number of embodiments considered by way of entirely nonlimiting examples and illustrated by the appended drawings, in which:

FIG. 1 shows the main stages of a manufacturing process according to the invention, and FIG. 2 shows the main parts of a double-layer SEI battery cell, according to the invention.

In order to solve the problem of the flaking of the graphite layer on the copper substrate, a chemical etching of the copper substrate is carried out before the formation of the graphite layer. This etching is designed to form a relief pattern, in particular via recesses at the surface of the copper substrate. During the coating of the graphite layer, the recesses are filled with graphite which makes possible the attachment of the graphite layer by mutual mechanical locking. In other words, the total surface area over which the adhesive forces can develop is increased.

The etching is carried out in the form of wet etching with a solution of $FeCl_3$, HCl and $H_2O$. The etching solution is applied for 30 seconds to the copper substrate. The copper substrate is subsequently washed consecutively with an ammonium bicarbonate $NH_4HCO_3$ solution and with water. The copper substrate is subsequently dried over a hot plate at 80° C.

In order to solve the SEI problem, a double-layer SEI was designed.

During a first stage, a stack of layers comprising a layer of nickel, manganese and cobalt (NMC) oxides, a graphite layer and a liquid lithium-based electrolyte between them is formed. The layer of nickel, manganese and cobalt oxides is of formula $LiNi_xMn_yCo_zO_2$, where x, y, and z represent atomic percentage values and x is of between 0.3 and 0.8, y is of between 0.1 and 0.3, and z is of between 0.1 and 0.3.

After the prelithiation of the graphite electrode, a first SEI is formed. The cell is subsequently cut in order to withdraw the liquid electrolyte/graphite electrode SEI.

During a second stage, a second cell is constructed with the liquid electrolyte/graphite electrode SEI withdrawn from the first cell. The second cell comprises a structure similar to that of the first cell but with a polymer lithium-based electrolyte instead of a liquid lithium-based electrolyte. After the prelithiation of the graphite layer in the second cell, a second SEI is formed at the interface between the liquid electrolyte SEI and the solid polymer electrolyte.

The double-layer SEI obtained makes possible a transfer of ions with the electrolyte to and from the graphite which is stable.

The process for the manufacture of the solid lithium battery comprises the following stages.

During a first stage 1, a copper substrate undergoes wet etching with a solution of $FeCl_3$, HCl and $H_2O$ ($FeCl_3$: 0.5-1 g, 36% HCl: 3-5 ml, $H_2O$: 12-15 ml).

During a second stage 2, a graphite layer is applied to the etched copper substrate.

During a third stage 3, a first cell is assembled, comprising the graphite layer on the etched copper substrate, an NMC layer and a liquid lithium-based electrolyte in contact both with the graphite layer and with the NMC layer.

During a fourth stage 4, a prelithiation of the graphite layer is carried out in the first cell with a discharge cycle, in a constant current and constant voltage (CCCV) mode at 0.05 C at ambient temperature and a voltage window of OCV-10 mV.

During a fifth stage 5, the cell is opened and the prelithiated graphite layer which is on the etched copper substrate is withdrawn.

During a sixth stage 6, a second cell is assembled, comprising the prelithiated graphite layer on the etched copper substrate, an NMC layer and a solid lithium-based electrolyte in contact with the prelithiated graphite layer and with the NMC layer. The solid lithium-based electrolyte is a dry polymer electrolyte, such as a porous membrane electrolyte made of poly(vinylidene fluoride)-poly(hexafluoropropylene) (PVDH-HFP) improved with lithium bis(trifluoromethylsulfonyl)imide (LiTFSI), also known under the name of PVDF-HFP LiTFSI. A second solid electrolyte interface layer is formed during a first charging.

During a seventh stage 7, a solid lithium battery is assembled, comprising at least two second cells in parallel.

FIG. 2 represents a second cell obtained by means of the manufacturing process. A second cell 10 comprises an NMC layer 11, a solid lithium-based electrolyte 12, a double-layer SEI 13, a graphite layer 14 and a copper substrate 15. The double-layer SEI 13 comprises a liquid electrolyte SEI 17 in contact with the graphite layer 14 and a solid electrolyte SEI 16 in contact with the solid lithium-based electrolyte 12. The NMC layer 11 forms the cathode of the second cell, while the prelithiated graphite forms the anode.

The invention claimed is:

1. A solid lithium cell formed by stacking of an etched copper substrate, of a graphite layer, of an electrolyte, and of a layer of nickel, manganese and cobalt oxides, the electrolyte being in contact with the graphite layer and the layer of nickel, manganese and cobalt oxides, the copper substrate forming an anode of the cell, and the layer of nickel, manganese and cobalt oxides forming a cathode of the cell, in which the electrolyte is a solid lithium-based electrolyte and the graphite layer exhibits a first solid electrolyte interface produced during a prelithiation with a liquid lithium-based electrolyte and a second solid electrolyte interface produced during a prelithiation with the solid lithium-based electrolyte.

2. The solid lithium cell as claimed in claim 1, in which the solid lithium-based electrolyte is a porous membrane electrolyte made of poly(vinylidene fluoride)-poly(hexafluoropropylene) improved with lithium bis(trifluoromethylsulfonyl) imide.

3. The solid lithium cell as claimed in claim 1, in which the copper substrate and the graphite layer are rendered integral mechanically.

4. The solid lithium cell as claimed in claim 1, in which the layer of nickel, manganese and cobalt oxides is of formula $LiNi_xMn_yCo_zO_2$, where x, y, and z represent atomic percentage values and x is of between 0.3 and 0.8, y is of between 0.1 and 0.3, and z is of between 0.1 and 0.3.

5. A solid lithium battery comprising at least two of the solid lithium cells as claimed in claim 1, the cells being fitted in parallel.

6. A manufacturing process for manufacturing the solid lithium battery as claimed in claim 5, comprising the following stages:

carrying out a wet etching of a copper substrate in order to obtain a relief pattern, placing a graphite layer on the etched copper substrate, assembling a first cell comprising the graphite layer on the etched copper substrate, a layer of nickel, manganese and cobalt oxides and a liquid lithium-based electrolyte in contact both with the graphite layer and with the layer of nickel, manganese and cobalt oxides, carrying out a prelithiation of the graphite layer of the first cell, withdrawing, from the first cell, the prelithiated graphite layer placed on the etched copper substrate, assembling a second cell comprising the prelithiated graphite layer on the etched copper substrate, a layer of nickel, manganese and cobalt oxides and a solid lithium-based electrolyte in contact with the prelithiated graphite layer and with the layer of nickel, manganese and cobalt oxides, and assembling a solid lithium battery comprising at least two second cells in parallel.

7. The manufacturing process for manufacturing the solid lithium battery as claimed in claim 6, in which the prelithiation of the first cell is carried out with a discharge cycle, in a constant current and constant voltage mode at 0.05 C at ambient temperature and a voltage window of OCV-10 mV.

8. The manufacturing process for manufacturing the solid lithium battery as claimed in claim 6, in which the etching of the copper substrate comprises the following stages:

applying a solution of $FeCl_3$, HCl and $H_2O$ for 30 seconds, washing the copper substrate with an ammonium bicarbonate $NH_4HCO_3$ solution and then with water, and drying the copper substrate over a hot plate at 80° C.

9. The manufacturing process for manufacturing the solid lithium battery as claimed in claim 6, in which the solid lithium-based electrolyte is a dry polymer electrolyte.

10. The manufacturing process for manufacturing the solid lithium battery as claimed in claim 9, in which the solid lithium-based electrolyte is a porous membrane electrolyte made of poly(vinylidene fluoride)-poly(hexafluoropropylene) improved with lithium bis(trifluoromethylsulfonyl) imide.

* * * * *